United States Patent
Nam et al.

(10) Patent No.: US 7,022,226 B2
(45) Date of Patent: Apr. 4, 2006

(54) ANAEROBIC BIOREACTOR FOR THE WASTEWATER-TREATMENT PLANT

(75) Inventors: Seung Yuep Nam, Daejeon (KR); Joong Chun Kwon, Daejeon (KR)

(73) Assignee: Global Technology DT. Inc., Daejeon (KR)

( * ) Notice: Subject to any disclaimer, the term of this patent is extended or adjusted under 35 U.S.C. 154(b) by 103 days.

(21) Appl. No.: 10/466,364

(22) PCT Filed: May 18, 2002

(86) PCT No.: PCT/KR01/02205

§ 371 (c)(1), (2), (4) Date: Jul. 16, 2003

(87) PCT Pub. No.: WO02/057189

PCT Pub. Date: Jul. 25, 2002

(65) Prior Publication Data

US 2004/0045900 A1   Mar. 11, 2004

(30) Foreign Application Priority Data

Jan. 19, 2001   (KR) .................... 2001-3148

(51) Int. Cl.
*C02F 3/00* (2006.01)

(52) U.S. Cl. .................. 210/195.3; 210/197; 210/220; 210/528; 210/532.1

(58) Field of Classification Search ............ 210/195.3, 210/197, 220, 528, 532.1
See application file for complete search history.

(56) References Cited

U.S. PATENT DOCUMENTS 6,352,643 B1 *   3/2002   Kwon et al. ................ 210/605

* cited by examiner

*Primary Examiner*—Chester T. Barry
(74) *Attorney, Agent, or Firm*—Staas & Halsey LLP

(57) ABSTRACT

The present invention relates to an apparatus for treating wastewater comprising aerobic microbes and an upflow anaerobic reactor in which the wastewater including various substances such as non-degradable and toxic materials and organic substances could be decomposed biologically. Anaerobic bio-reaction effect could be maximized by maintaining uniformity of inflowing wastewater and recycle sludge or by deferring the heights of inlets.

8 Claims, 15 Drawing Sheets

ANAEROBIC BIOREACTOR FOR THE WASTEWATER-TREATMENT PLANT

TECHNICAL FIELD

The present invention relates to an apparatus for treating wastewater including an upflow anaerobic reactor. More particularly, in the anaerobic reactor including aerobic microbes and an upflow anaerobic reactor, outflow tubes of wastewater and returning sludge is introduced by rotating and depending upon occasions, the introduction heights of the wastewater and the returning sludge is differentiated to obtain maximum effects of the anaerobic reaction.

BACKGROUND ART

In Korean Laid-open Patent No. 2000-31978, the inventors of the present invention have disclosed the apparatus for treating wastewater comprising aerobic microbes and an upflow anaerobic reactor and the method therefor. The apparatus can treat organic wastewater containing indecomposable and toxic substances, nutritive materials (N, P) and heavy metals, and maintain high concentration of sludge stably and economically. As a reference, the conventional technique is described in FIG. 1a and FIG. 1b.

As illustrated in FIG. 1a, the conventional apparatus comprises an anaerobic tank, an aerobic tank and a precipitate tank. Concretely, the fixed porous inflow device is installed on the lower portion of the anaerobic tank. Wastewater and returning sludge flow into the inflow device through an inject portion. FIG. 1b depicts a planar view of the inflow device schematically.

In the conventional method, the returning sludge returned by a return pump is injected to the anaerobic reactor through the inject portion and the inflow device and then stirred continuously by a mixing device so that a biased stream of sludge flowing upward and a blocking circuit phenomenon of an inflow mixture are prevented. However, there are some problems in the conventional technique. Precisely, since the inflow device is fixed and the wastewater or the returning sludge is always thrown onto a fixed region, the concentrations of the wastewater and the sludge are not maintained uniformly and the biased current is not prevented sufficiently even though the mixing device is operated.

DISCLOSURE OF INVENTION

In order to settle the disadvantages of the conventional method described above, the object of the present invention is to provide an apparatus for treating wastewater comprising an anaerobic reactor in which a wastewater outflow tube 6a and a returning sludge outflow tube 6b rotate on the axis so that the wastewater and the returning sludge are discharged uniformly from the constant surface of the anaerobic reactor when the wastewater and the returning sludge are injected to the anaerobic reactor.

In the first type of the present invention, the upflow anaerobic reactor 1 for treating wastewater comprises a principal axis 2 which is formed vertically in the center of the anaerobic reactor 1 and rotates in accordance with a driving force transferred from a driving means; a wastewater inflow tube 3 and a returning sludge inflow tube 4 which are installed in an outer and upper portion of the anaerobic reactor 1 and through which wastewater and returning sludge are injected respectively; a retentive portion 5 which is installed and fixed on the upper circumference of the principal axis 2, rotates with the principal axis 2 and through which the wastewater and the returning sludge injected from the ends of the wastewater inflow tube 3 and the returning sludge inflow tube 5 pass; a single or multiple outflow tubes 6 which are installed and fixed onto the principal axis 2 so as to rotate with the principal axis 2 and have one end connected with the retentive portion 5, the other end installed in the inner and lower portion of the anaerobic reactor 1 and equipped with a porous tube which discharges a mixture of the wastewater and the returning sludge; an outflow device 7 which is installed onto an upper portion of the anaerobic reactor 1 and has a weir structure in order to discharge reaction water containing some sludge through the aerobic reactor 20; and a sludge condensing device 8 which is installed onto a lower portion of the anaerobic reactor 1 and treats the sludge precipitated in the central lower portion of the anaerobic reactor 1 by using a gravitational force.

The present invention will now be described with references to the accompanying drawings.

The upflow anaerobic reactor 1 of the present invention, a type of the upper portion inflow type, will be illustrated more clearly, referring to FIG. 2a and FIG. 2b.

Above all, the anaerobic reactor 1 of the present invention comprises a principal axis 2, a wastewater inflow tube 3, a returning sludge inflow tube 4, a retentive portion 5, an outflow tube 6, an outflow device 7 and a sludge condensing device 8 as described above.

The principal axis 2 is connected to and fixed to the retentive portion 5 and the outflow tube 6 and is formed perpendicular to the center of the anaerobic reactor 1 so as to rotate together by using a driving force of the principal axis motor M.

The wastewater inflow tube 3 and the returning sludge inflow tube 4 are installed onto the outer and upper portion in order to inject the inflow water and the returning sludge flowing back from the final precipitate tank to the anaerobic reactor 1 by using a driving force of the sludge return pump respectively. The wastewater inflow tube 3 and the returning sludge inflow tube 4 can be injected to the inside of the anaerobic reactor 1 independently as depicted in FIG. 2a and FIG. 2b, but they also can be combined to form one tube in the outside of the anaerobic reactor 1 and injected to the retentive portion 5 in a mixed state of the returning sludge to remove inflow water, organic chemicals within the inflow water, nutritive salts and the like (not depicted).

Next, the wastewater and the returning sludge introduced from the ends of the wastewater inflow tube 3 and the returning sludge inflow tube 4 are transferred through the retentive portion 5. The retentive portion 5 is also installed and fixed on the upper circumference of the principal axis 2 and rotates according to the rotation of the principal axis 2. The wastewater and the returning sludge are mixed in the retentive portion 5. The retentive portion 5 can be shorten to place only the upper portion of the principal axis 2 (See FIG. 2a) as well as can be extended from the upper portion of the anaerobic reactor 1 to the lower portion of the principal axis 2 (See FIG. 2b).

The outflow device 7 is installed on the upper portion of the anaerobic reactor 1 and has a weir structure in which the reaction water containing some sludge matured sufficiently in the process of the anaerobic reactor 1 is discharged through the aerobic reactor 20. Preferably, the outflow device 7 which prevents the block phenomenon caused by the sludge and makes the outflow water discharged uniformly has a weir structure which is installed in a radiation mode from the center as disclosed in Korean Laid-open Patent No. 2000-31978.

The outflow device 7 is installed on the upper portion of the anaerobic reactor 1 and has a ware structure in which the reaction water containing some sludge matured sufficiently in the process of the anaerobic reactor 1 is discharged through the aerobic reactor 20. Preferably, the outflow device 7 which prevents the block phenomenon caused by the sludge and makes the outflow water discharged uniformly has a ware structure which is installed in a radiation mode from the center as disclosed in Korean Laid-open Patent No. 2000-31978.

As another the upper portion inflow type of the anaerobic reactor 1, the present invention provides an anaerobic reactor 1 which adopts a mode that the inflow water and the returning sludge are not blended and are discharged to the lower portion in the reactor independently. The present invention will be described more clearly, referring to FIG. 3a and FIG. 3b.

In this type, the wastewater inflow tube 3 and the returning sludge inflow tube 4 which can inlet the wastewater and the returning sludge respectively are installed in the outer and upper portion of the anaerobic reactor 1 independently. In addition, the wastewater retentive portion 5a passing through the wastewater and the sludge retentive portion 5b passing through the returning sludge are installed and separated spatially and the wastewater outflow tube 6a, 6 discharging the wastewater are connected directly to the wastewater retentive portion 5a and the sludge outflow tube 6b, 6 discharging the returning sludge are connected directly to the sludge retentive portion respectively. The wastewater retentive portion 5a and the sludge retentive portion 5b (thus, the wastewater outflow tube 6a, 6 and the sludge outflow tube 6b, 6 also) are installed and fixed on the upper circumference of the principal axis 2 and rotate together according to the rotation of the principal axis 2.

On the other hand, the wastewater inflow tube 3 and the returning sludge inflow tube 4 are fixed on the reactor not to be moved or rotated, but the wastewater retentive portion 5a and the sludge retentive portion 5b rotate with the principal axis 2. Therefore, in their composition, the wastewater should be injected from the wastewater inflow tube 3 to the wastewater retentive portion 5a and the returning sludge should be injected from the returning sludge inflow tube 4 to the sludge retentive portion 5b. For this purpose, one portion selected in between the wastewater retentive portion 5a and the sludge retentive portion 5b is included to the other portion preferably as illustrated in FIG. 4. The wastewater retentive portion 5a and the sludge retentive portion 5b can be shorten in the length so that only the upper portion of the principal axis 2 is placed (See FIG. 3a) and can be extended from the upper portion of the anaerobic reactor 1 to the lower portion of the principal axis 2 (See FIG. 3b).

Like the outflow tube 6 in the first type of the present invention described above, the wastewater outflow tube 6a, 6 and the sludge outflow tube 6b, 6 are connected directly with the wastewater retentive portion 5a and the sludge retentive portion 5b in one ends respectively and the other ends are placed on the inner and lower portion of the anaerobic reactor 1. At the other ends, the porous tubes are formed so as to discharge the wastewater and the returning sludge.

The second type of the present invention comprises a principal axis 2, an outflow device 7, a sludge condensing device 8 and the like, which are common in the structure and the functions with the first type.

In addition, the upflow anaerobic reactor 1 for treating wastewater for applying the second type of the present invention comprises a principal axis 2 which is formed vertically in the center of the anaerobic reactor 1 and rotates according to a driving force transferred by a driving means; a wastewater inflow tube 3 and a returning sludge inflow tube 4 which are installed onto the outer and upper portion of the anaerobic reactor 1 and through which the wastewater and the returning sludge are injected respectively; a retentive portion 5 which is installed and fixed on the lower circumference of the principal axis 2, rotates with the principal axis 2, is connected directly with the wastewater inflow tube 3 and the returning sludge inflow tube 4 and through which the wastewater and the returning sludge pass; a single or multiple outflow tubes 6 which are installed and fixed onto the principal axis 2, rotate with the principal axis 2, have one end connected with the retentive portion 5 directly, the other end installed on the inner and lower portion of the anaerobic reactor 1 and equipped with a porous tube which discharges a mixture of the wastewater and the returning sludge; an outflow device 7 which is installed onto the upper portion of the anaerobic reactor 1 and has a weir structure in order to discharge reaction water containing some sludge through the aerobic reactor 20; and a sludge condensing device 8 which is installed onto the lower portion of the anaerobic reactor 1 and treats the sludge precipitated in the central lower portion of the anaerobic reactor 1 by using a gravitational force.

As a lower portion inflow type, the present invention provides the anaerobic reactor 1 in which the inflow water and the returning sludge are injected from the lower portion of the anaerobic reactor 1. This type will be described more clearly, referring to FIG. 5a and FIG. 5b.

Above all, the upflow anaerobic reactor 1 like the upper portion inflow type comprises a principal axis 2, a wastewater inflow tube 3, a returning sludge inflow tube 4, a retentive portion 5, an outflow tube 6, an outflow device 7 and a sludge condensing device 8. The wastewater inflow tube 3, the returning sludge inflow tube 4, the retentive portion 5 and the outflow tube 6 are distributed in the direction from the lower portion to the upper portion of the anaerobic reactor 1, which is different from the upper portion inject type described above.

The wastewater inflow tube 3 and the returning sludge inflow tube 4 are installed onto the outer and lower portion of the anaerobic reactor 1 in order to introduce the wastewater and the returning sludge to the anaerobic reactor 1 respectively. The wastewater inflow tube 3 and the returning sludge inflow tube 4 can be injected to the inside of the anaerobic reactor 1 independently as depicted in FIG. 5a, but they also can be combined to form one tube in the outside of the anaerobic reactor 1 and be injected to the retentive portion 5 in a mixed state (not depicted).

Next, the retentive portion 5, through which the wastewater and the returning sludge pass, is connected directly to the wastewater inflow tube 3 and the returning sludge inflow tube 4. The retentive portion 5 is installed onto the contact region of the anaerobic reactor 1 case and the lower portion of the principal axis 2. The retentive portion 5 has an associated structure (See FIG. 5b). The lower part of the retentive portion 5 is fixed onto the case of the anaerobic reactor 1 and the upper part of the retentive portion is fixed onto the principal axis 2. The inside of the retentive portion 5 should be separated from the outside of the retentive portion 5 (preventing liquid from passing). Preferably, the contact region formed in between the lower part of the retentive portion 5 and the upper part of the retentive part 5 has a mechanically-sealed bearing structure for the rotation, since the upper part of the retentive portion 5—the principal axis 2 should rotate freely against the lower portion of the retentive part 5—the anaerobic reactor 1 case which are fixed.

The outflow tube 6 is connected directly to the upper part of the retentive portion 5 and placed on the lower part within the anaerobic reactor 1, which can make the inflow water and the returning sludge passing through the retentive portion 5 injected to the lower part within the anaerobic reactor 1. The inflow water and the returning sludge are discharged through a porous tube (having a pore pierced on the tube) or a nozzle which is installed in a surface of the outflow tube 6.

In the functions and compositions, the principal axis 2, the outflow device 7 and the sludge condensing device 8 are same with those of the upper portion inflow type and the retentive portion 5 and the outflow tube 6 are also same with those of the upper portion inflow type so that the principal axis 2 is installed and fixed to rotate together.

As another type of an anaerobic reactor 1 in the lower portion inflow type, the present invention provides an anaerobic reactor 1 which adopts a mode that the inflow water and the returning sludge are not blended and are discharged to the lower part within the reactor independently. The present invention will be described more clearly, referring to FIG. 6a and FIG. 6b.

In this type, the wastewater inflow tube 3 and the returning sludge inflow tube 4 which can inject the wastewater and the returning sludge respectively are installed onto the outer and upper part of the anaerobic reactor 1 independently. In addition, the wastewater retentive portion 5a passing the wastewater and the sludge retentive portion 5b passing the returning sludge are installed and separated spatially and the wastewater outflow tube 6a, 6 discharging the wastewater is connected directly to the wastewater retentive portion 5a. The sludge outflow tube 6b, 6 discharging the returning sludge are connected to the sludge retentive portion 5b respectively.

On the other hand, the wastewater inflow tube 3 and the returning sludge inflow tube 4 are fixed on the reactor not to be moved or rotated, but the wastewater retentive portion 5a and the sludge retentive portion 5b should rotate with the principal axis 2. For this purpose, as depicted in FIG. 6b each retentive portion 5 become a structure associated with the lower retentive portion 5 fixed on the anaerobic reactor 1 case and the upper retentive portion 5 fixed on the principal axis 2. Between the wastewater retentive portion 5a and the sludge retentive portion 5b, one should be included to the other portion preferably. Due to the same reasons with the first type of the lower portion inflow type, preferably, the contact region of the lower retentive portion 5—the upper retentive portion 5 has a mechanically-sealed bearing structure for the rotation.

In the functions and compositions, the principal axis 2, the outflow device 7 and the sludge condensing device 8 are same as the upper portion inflow type and the retentive portion 5 and the outflow tube 6 are also same as the upper portion inflow type so that the principal axis 2 is installed and fixed to rotate together.

In the anaerobic reactor 1 having the said functions and structures, the porous tube formed on the outflow tube 6 has a diameter preventing the block phenomenon by sludge preferably. In addition, when the outflow tube 6 rotates together according to the rotation of the principal axis 2. As the distance of the porous type become nearer to the rotational axis, the time period that each porous tube stays at the specific position on the horizontal surface on which the outflow tube 6 rotates become longer. Therefore, in order to make the discharging distribution of the wastewater and the returning sludge uniform, the nearer to the rotation axis, the wider the distance between the porous tubes distributed or the smaller the diameter of the porous tube formed preferably. Depending upon the size of the reactor, the kinds of inflow water for the treatment and the like, preferably the distance between porous tubes is in the range of 20 cm~2 m and the diameter of the porous tube is in the range of 21 mm~150 mm.

The porous tube can be installed on any position such as a bottom surface, an upper surface and a lateral portion of the outflow tube 6. Preferably, in case that the porous tube is installed on the bottom surface, various shapes of nozzle are installed right under the porous tube in order to distribute the wastewater or the returning sludge easily (See FIG. 7).

The single or multiple outflow tube 6 can be installed, depending upon the scale and the structure of the anaerobic reactor 1. Preferably, in case that the diameter of the reactor is in the range of 6~10 m, four outflow tubes 6 (in case that the inflow water and the sludge are discharged in a mixed state) or four wastewater outflow tubes 6a and the sludge outflow tube 6b (in case that the inflow water and the sludge are discharged in a separated state) respectively are installed at 90° C. of angle from the horizontal surface. In the latter case, the installation heights of the wastewater outflow tube 6a and the sludge outflow tube 6b are preferable to become different. If the outflow tubes 6 are installed with less than four, they generate the biased flow and if with more than four, the apparatus become complicated and increases the cost to be installed.

If the diameter of the anaerobic reactor 1 becomes more than 8 m, the inflow water and the sludge cannot be discharged uniformly in between the portion adjacent to the rotational axis and its outer portion, although the porous tube formed onto the outflow tube 6 is adjusted for the distance and/or the diameter. In this case, the outflow tube 6 for the portion adjacent to the rotational axis and the outflow tube 6 for the outer portion are separated and installed so that the biased flow of the inflow water and the sludge can be reduced efficiently (not depicted).

In the anaerobic reactor 1 of the present invention, the mixing device 40 which shakes reaction water continuously can be installed, which purifies organic wastewater containing indecomposable and toxic substances and nutritive substances (N, P) within the anaerobic reactor 1, since it prevents the biased flow of sludge and proceeds the fermentation reaction actively by microorganisms. In this case, the mixing device 40, with 3~6 devices per a reactor, is installed in an interval of about 50 cm~1 m from the principal axis 2 of the anaerobic reactor 1. The sludge precipitated from the reaction with the mixing device 40 is collected in the lower center of the anaerobic reactor 1 through the sludge condensing device 8 and discharged to the outside of the reactor by a driving force of the sludge discharging pump.

Hereinafter, among the upflow anaerobic reactor 1 of the present invention, the second upper portion inflow type anaerobic reactor 1 is applied to the apparatus for treating wastewater and will be explained clearly about the operation and effects. The structure of the apparatus for treating wastewater is depicted in FIG. 8.

As an example, the apparatus for treating wastewater includes the aerobic reactor 20 and the final precipitate tank 30 in addition to the upflow anaerobic reactor 1. At this moment, the aerobic reactor 20 includes an acid radical tube 31 as an oxygen generator in the bottom part of the aerobic reactor 20 in order to provide oxygen sufficiently so that it makes air-permeable fermenting bacteria become active. For the aerobic reactor 20, any conventional material and structure known to those skilled in the art can be adopted. Besides, the final precipitate tank 30 is utilized to remove sludge which is degraded efficiently by using the aerated microorganisms within the reaction water of the aerobic reactor 20. Preferably, the precipitate tank 30 in a gravity mode is utilized to remove the sludge slowly by exploiting the gravitational force so that the wastewater is cleaned and purified. Besides, the precipitated sludge is collected in the sludge condensing device 8, returned to the sludge retentive portion 5b passing through the returning sludge inflow tube 4 installed onto the outer and upper portion of the anaerobic reactor 1 by using the sludge returning pump 32 and then discharged into the anaerobic reactor 1 through the sludge outflow tube 6b, 6. The wastewater is transferred to the wastewater retentive portion 5a passing through the wastewater inflow tube 3 installed onto the outer and upper portion of the anaerobic reactor 1 and then discharged to the bottom portion of the anaerobic reactor 1 through the wastewater outflow tube 6a, 6. At this moment, the wastewater and the returning sludge are discharged from the bottom portion horizontal surface uniformly since the wastewater outflow tube 6a, 6 and the sludge outflow tube 6b, 6 rotate in a determined speed. The sludge decomposed efficiently within the anaerobic reactor 1 is precipitated in the bottom surface of the anaerobic reactor 1 by the gravity and then the sludge is separated and discharged through the sludge outflow pump 33. In the process of the reaction, the reaction water in which organic substances and toxic substances are decomposed and removed is injected to the aerobic reactor 20 through the outflow device 7. Meanwhile, the anaerobic reactor 1 provides a driving force which shakes the mixing device 40 connected with the principal axis 2 within the aerobic reactor 1 since the driving apparatus is installed in the upper portion end of the principal axis 2.

Hereinafter, the process for treating wastewater by exploiting the upflow anaerobic reactor 1 will be illustrated in accordance with each stage clearly (See FIG. 8).

Stage 1: Inflow of Inflow Water to Anaerobic Reactor

The inflow water such as organic wastewater including indecomposable and toxic substances and nutritive substances (N, P) is injected into the anaerobic reactor 1 through the wastewater inflow tube 3 installed on the outer and upper part of the anaerobic reactor 1, the wastewater retentive portion 5a and the wastewater outflow tube 6a, 6.

Stage 2: Fermentation in Anaerobic Reactor

In order to purify inflow water containing indecomposable and toxic substances and nutritious substances and injected to the anaerobic reactor in the previous stages efficiently, the activated sludge is introduced to the anaerobic reactor 1 through the returning sludge inflow tube 4 installed on the outer and upper portion of the anaerobic reactor 1, the sludge retentive portion 5b, and the sludge outflow tube 6b, 6. Then, the sufficient fermentation is induced by repeatedly stirring the mixing device 40 installed on the principal axis within the reactor in the range of 3~20 rpm (Sometimes, the mixing device 40 can be omitted in case that reaction water is mixed by the outflow tube 6 itself).

In the meantime, in order to purify organic wastewater more efficiently which includes indecomposable and toxic substances or nutritive substances such as nitrogen or phosphorus and heavy metals (not depicted), the anaerobic reactor 1 of the present invention can be installed plurally in a series. In this case, reaction water firstly fermented in the anaerobic reactor 1 installed in the front side is transferred to the wastewater inflow tube 3 of the anaerobic reactor 1 installed in the rear. Thereafter, the returning sludge including partial sludge of the aerobic reactor 20 which is inner-circulated by the inner rotation pump is injected to the anaerobic reactor 1 installed in the rear side and is secondly fermented with preventing an upward drift of sludge in a proper condition (the mixing device 40 is operated, if necessary). This stirring prevents a blocking circuit phenomenon of inflowing mixtures resulted from a high concentration of sludge when the sludge in the anaerobic tank 1 and an organic wastewater mixture increase by performing the above reaction.

At this moment, preferably the rotational speed of the mixing device 40 or the outflow tube 6 is in the range of 3~10 m/min at a circumference speed based on a circle drawn by an outer block of the mixing device 40 or the outflow tube 6. When the circumference speed is under 3 m/min, the blocking circuit phenomenon disturbs a sufficient reaction. When the circumference speed is above 10 m/min, the merit of a pressing-out type reactor cannot be fully considered since it is mixed completely.

Stage 3: Outflow Into Aerobic Reactor

Some sludge precipitated through the previous procedure is collected to the sludge condensing device 8 installed on the bottom center of the anaerobic reactor 1 and discharged by the driving force of the sludge discharging pump 33. The reaction water including some upward sludge is discharged from the anaerobic reactor 1 to the aerobic reactor 20 through the outflow device 7 placed in the upper portion of the anaerobic reactor 1.

Stage 4: Aeration in Aerobic Reactor

Oxygen is supplied sufficiently to reaction water including some sludge discharged from the anaerobic reactor 1 in the previous procedure through the acid radical tube 31. Consequently, organic substances and the like within wastewater are oxidized, decomposed and purified into inorganic substances such as $H_2O$, $CO_2$ or so on to activate aerobic or permeable bacteria in the sludge highly. Ammonia nitrogen and organic nitrogen are changed to nitric nitrogen and the sludge takes phosphorus excessively.

Stage 5: Separation of Pure Water and Return of Sludge

Pure water is separated from the reaction water partially purified in the previous aeration process and moved to the final precipitation tank 30. The sludge precipitated by the gravity is collected on the sludge condensing device 8 placed in the bottom center of the anaerobic reactor 1, returned into the anaerobic reactor 1 through the returning sludge inflow tube 4 placed on the outer and upper portion of the anaerobic reactor 1 by using the driving force of the sludge return pump 32 and exhausted to outside through the sludge reducer of the sludge digestion tank or the dehydrator using the driving force of the sludge outflow pump 33 in the anaerobic reactor 1.

As described above, some microbes such as *Nitrosomonas, Nitrobacter,* Denitrifier, Sulfate reducing bacteria, *Pseudomonas, Achromobacter, Aerhobacter, Micrococcus, Bacillus, Proteus, Flavobacterium, Acinetobacter, Corynebacterium* or *Mycobacterium* can be applied to the anaerobic reactor 1 or the aerobic reactor 20 in the method for treating wastewater in accordance with the present invention. In addition, some permeable microbes also can be used in accordance with the sorts of organic substances included in wastewater.

As illustrated above, the apparatus for treating wastewater of the present invention including the anaerobic reactor 1, which treats organic wastewater including indecomposable and toxic substances and nutritive substances by using permeable microbes and the upflow anaerobic reactor, can treat wastewater more efficiently than the conventional apparatus for treating wastewater.

BRIEF DESCRIPTION OF THE DRAWINGS

The above and other objects, features and other advantages of the present invention will be more clearly understood from the following detailed description taken in conjunction with the accompanying drawings, in which;

FIG. 4 depicts an schematic diagram of an example in the retentive portion and the outflow tube applied to FIG. 3a;

FIG. 5b depicts a partial schematic view of the retentive portion applied to FIG. 5a;

FIG. 6b depicts a partial schematic view of the retentive portion applied to FIG. 6a;

EXPLANATION OF SYMBOLS IN THE FIGURES

Figure 1A:
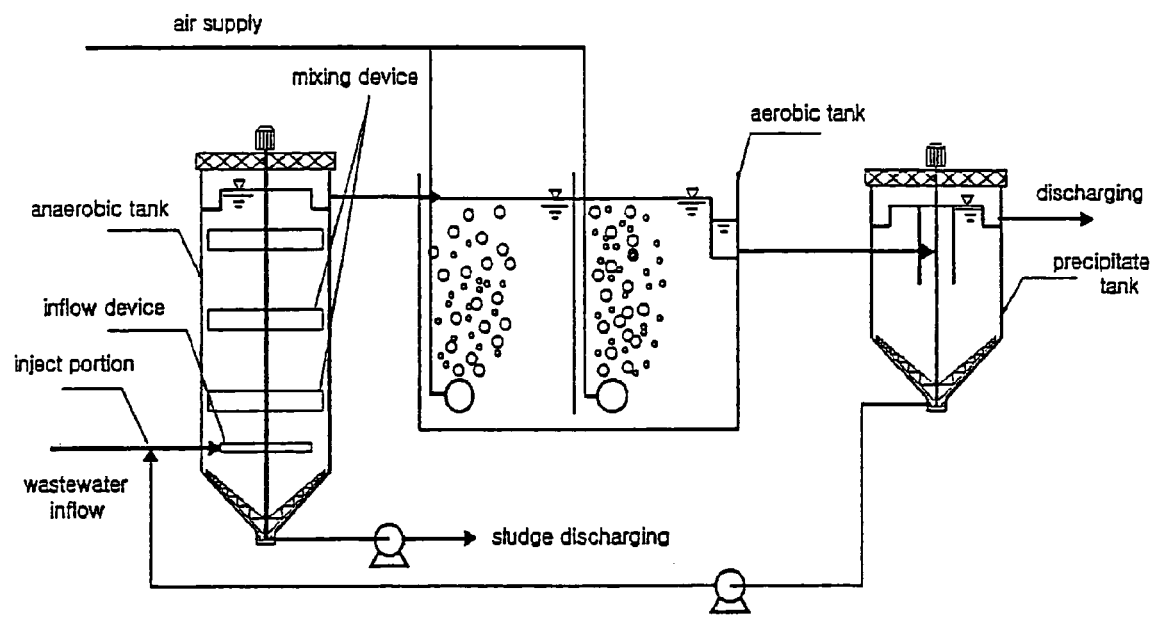
FIG. 1a depicts a schematic diagram of the first embodiment in the conventional apparatus.
Figure 1B:
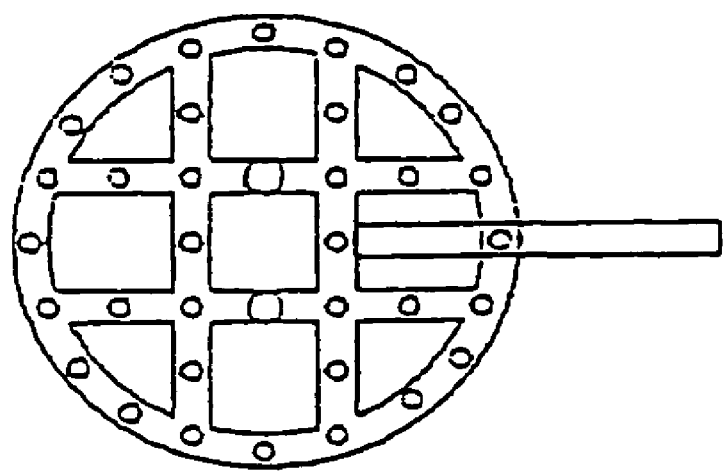
FIG. 1b depicts a planar view of the inflow device in the conventional apparatus schematically.
Figure 2A:
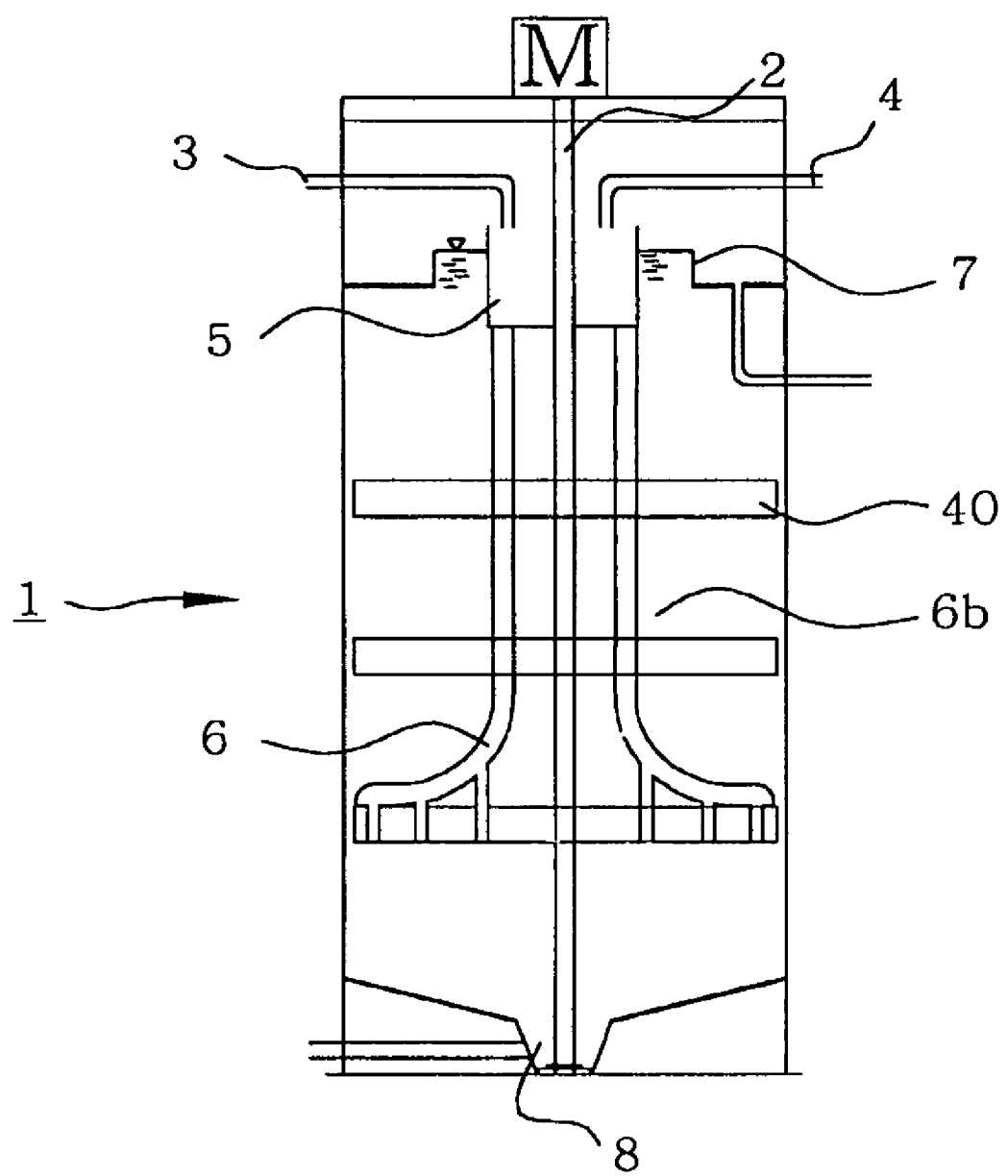
FIG. 2a depicts an schematic view of the upward inflow type reactor in which wastewater and returning sludge are injected with a combined mode in the present invention.
Figure 2B:
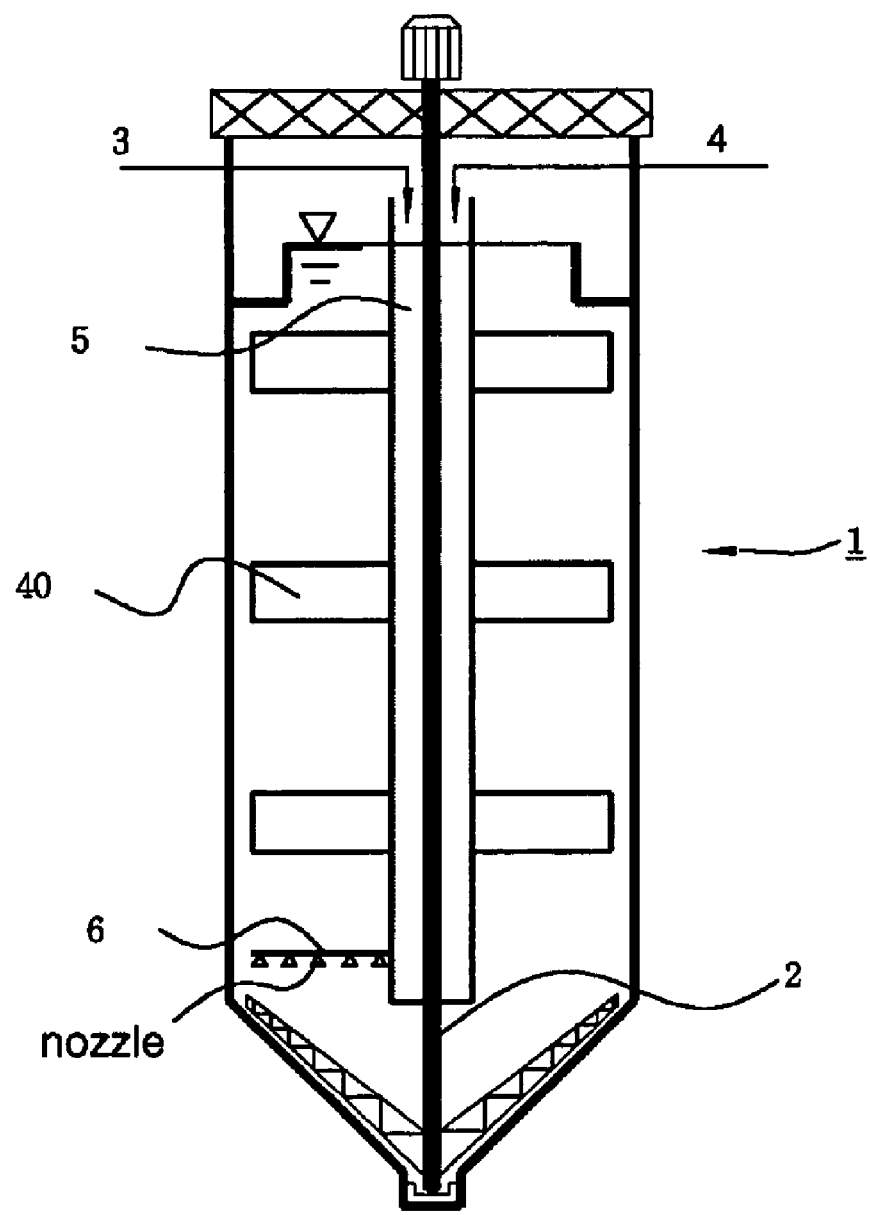
FIG. 2b depicts another schematic view of the upward inflow type reactor in which wastewater and returning sludge are injected with a combined mode in the present invention.
Figure 3A:
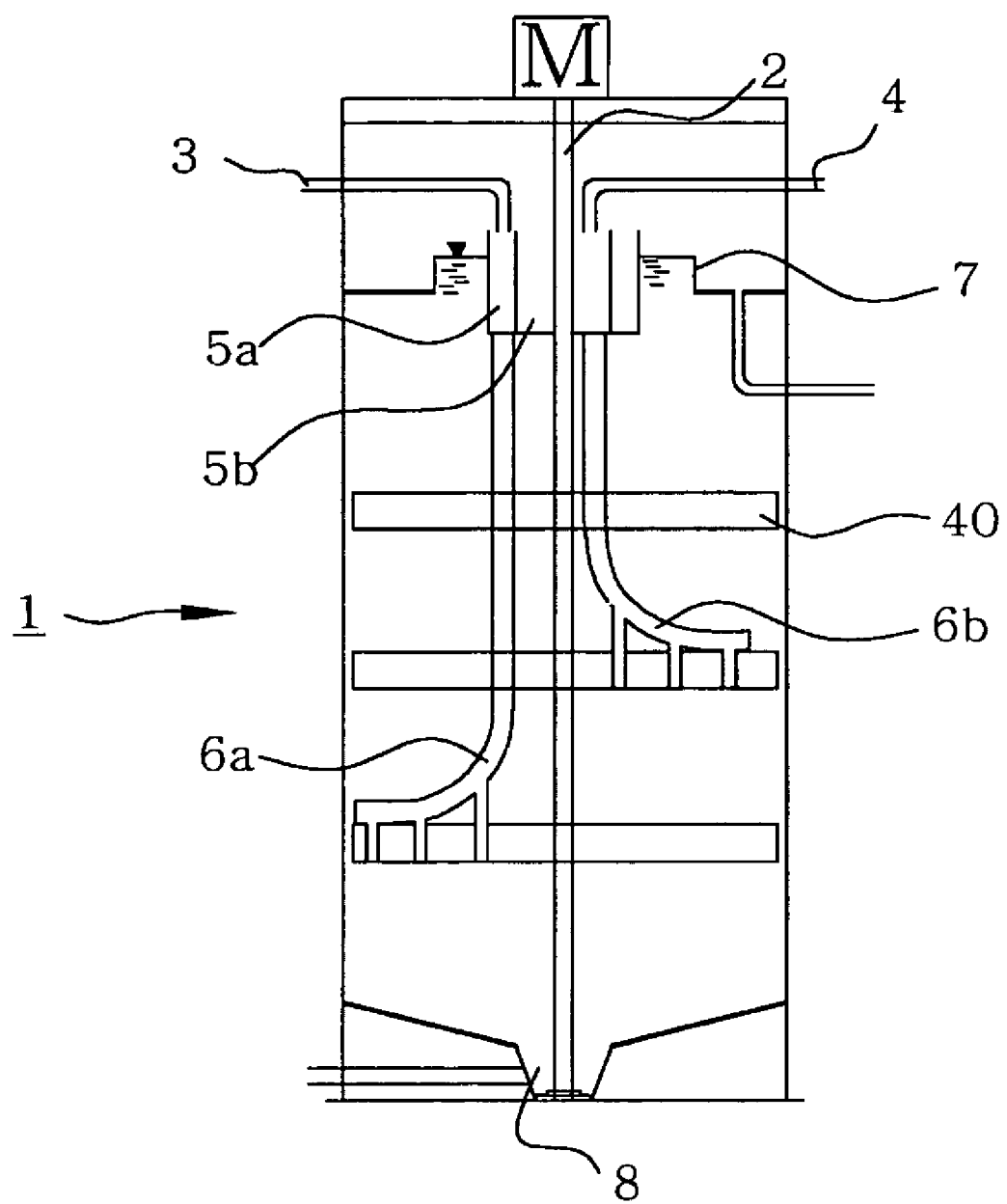
FIG. 3a depicts an schematic view of the upward inflow type reactor in which wastewater and returning sludge are injected with a separated mode in the present invention.
Figure 3B:
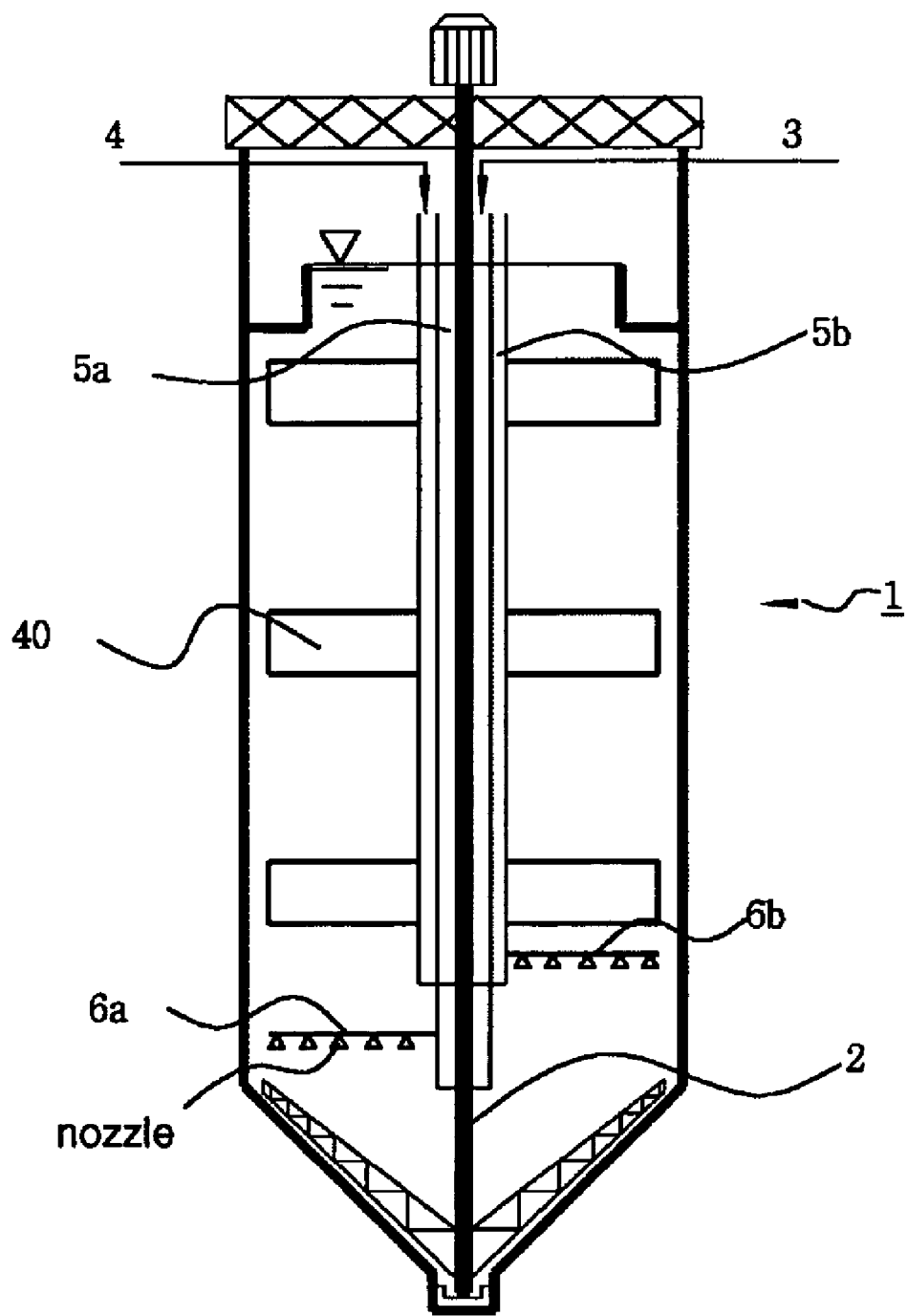
FIG. 3b depicts another schematic view of the upward inflow type reactor in which wastewater and returning sludge are injected with a separated mode in the present invention.
Figure 4:
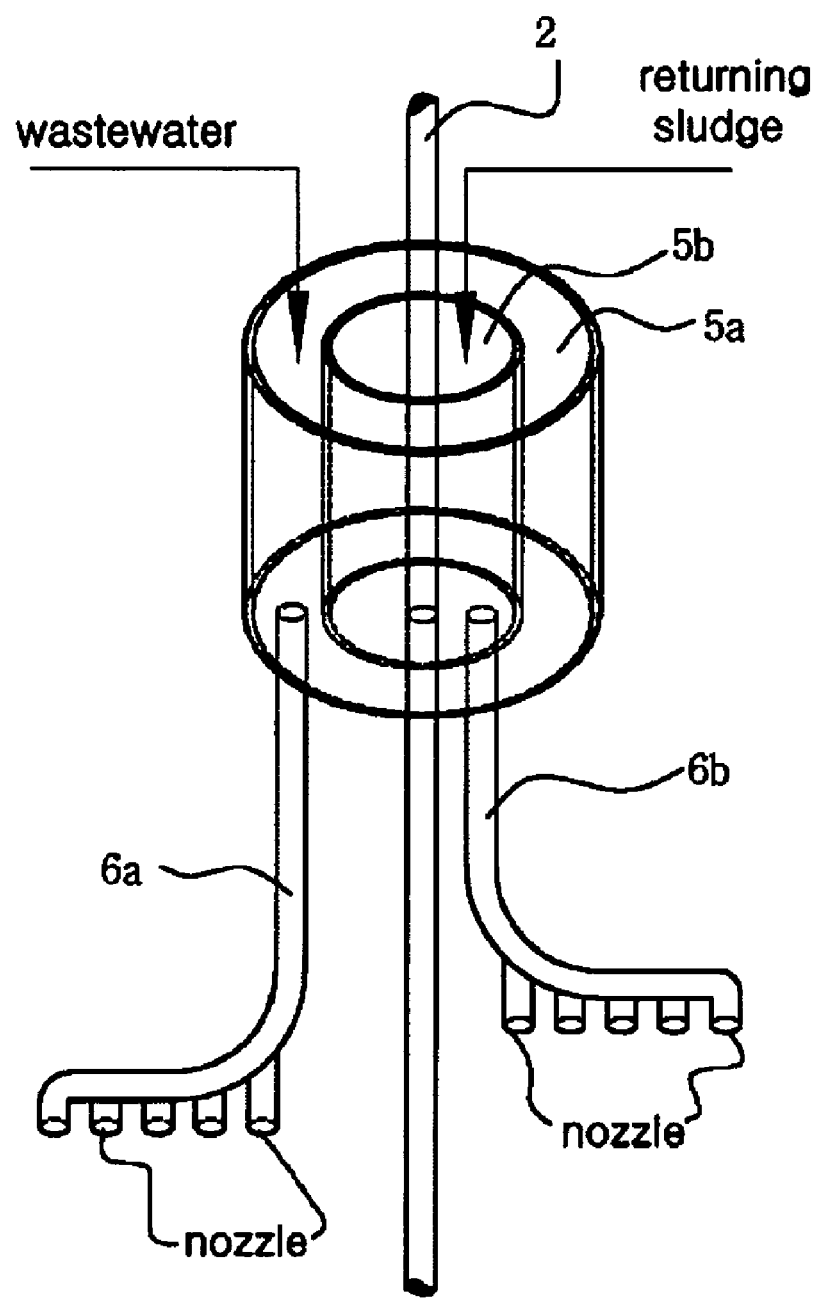
Figure 5A:
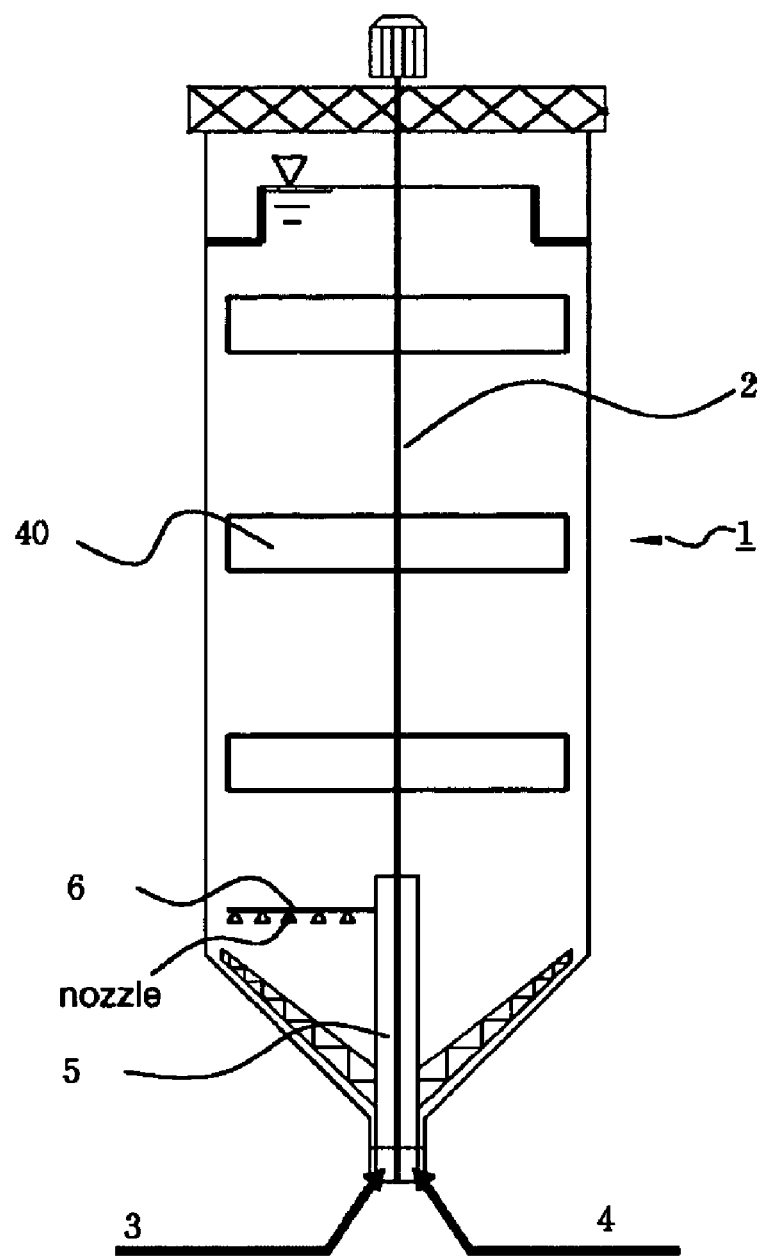
FIG. 5a depicts an schematic diagram of the downward inflow type reactor in which wastewater and returning sludge are injected with a combined mode in the present invention.
Figure 5B:
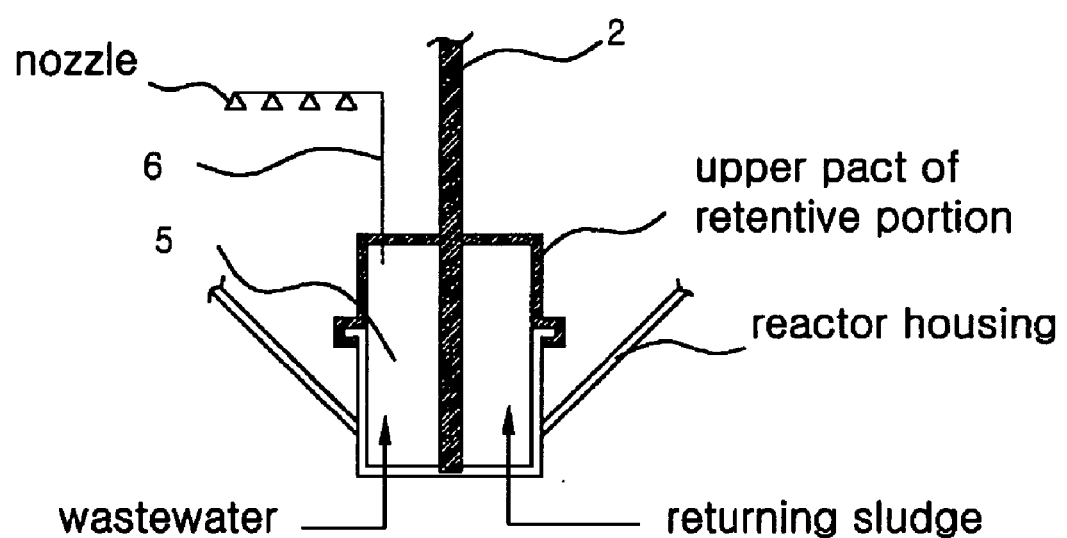
Figure 6A:
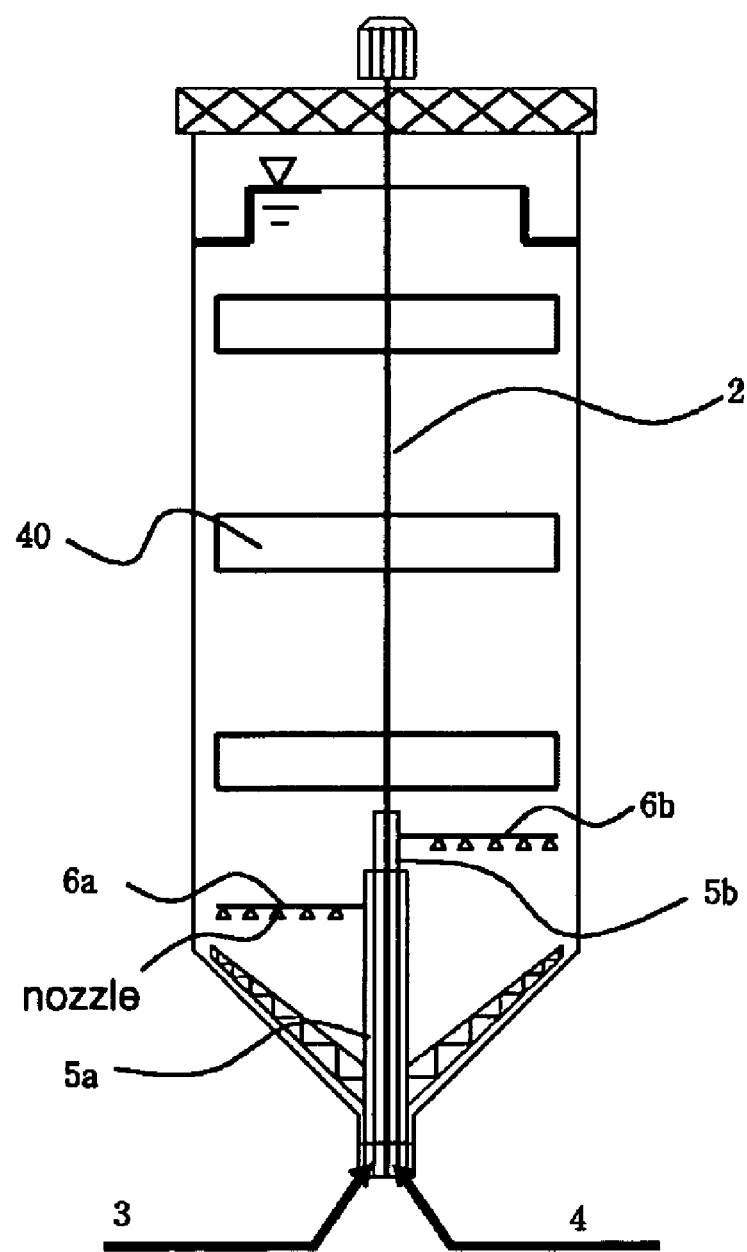
FIG. 6a depicts an schematic view of the downward inflow type reactor in which wastewater and returning sludge are injected with a separated mode in the present invention.
Figure 6B:
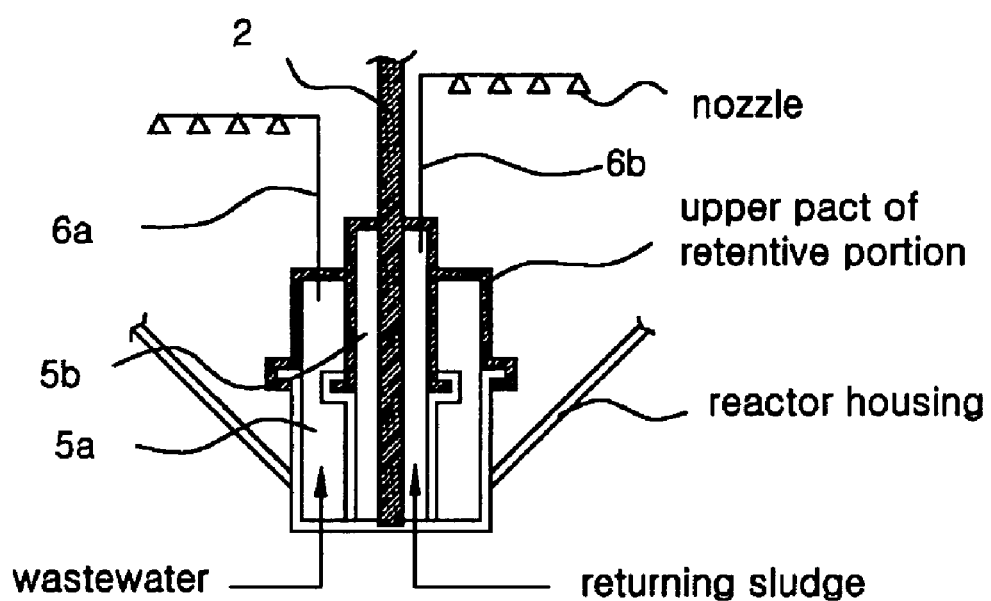
Figure 7:
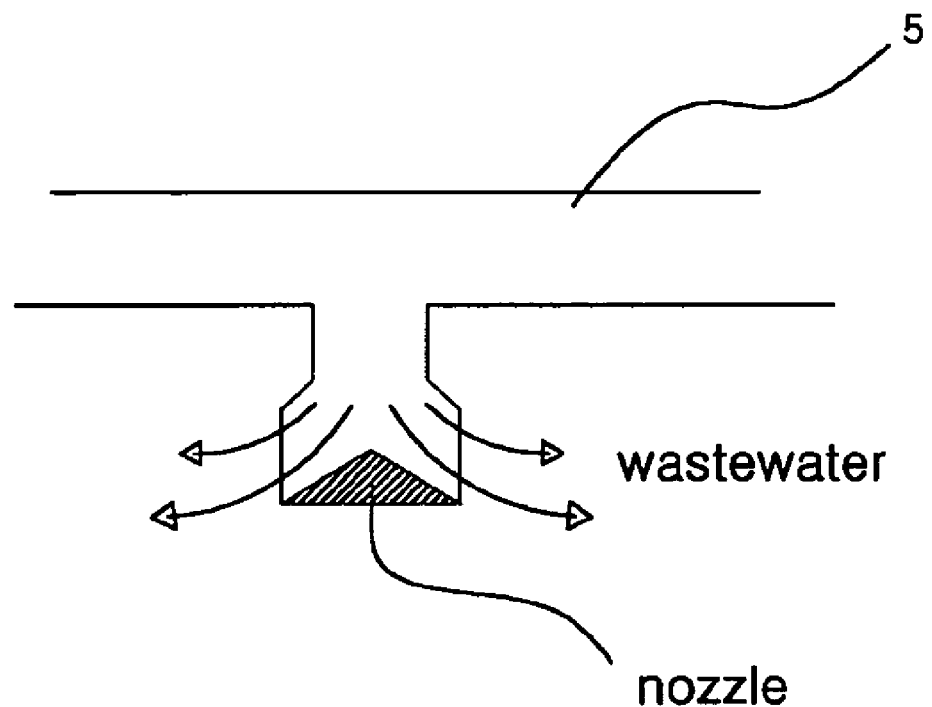
FIG. 7 depicts an example of the nozzles of the present invention.
Figure 8:
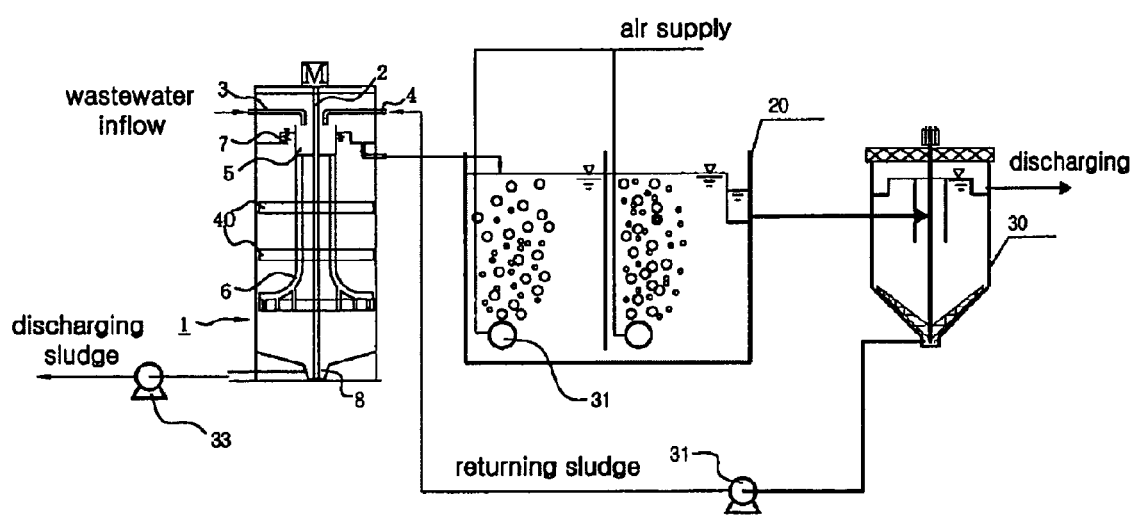
FIG. 8 depicts the structure in the apparatus for treating wastewater including the anaerobic reactor of the present invention.

1: anaerobic reactor
2: principal axis
3: wastewater inflow tube
4: returning sludge inflow tube
5: retentive portion
5a: wastewater retentive portion
5b: sludge retentive portion
6: outflow tube
6a: wastewater outflow tube
6b: sludge outflow tube
7: outflow device
8: sludge condensing device
20: aerobic reactor
30: precipitate tank
31: acid radical tube
32 sludge returning pump
33: sludge discharging pump
40: mixing device Practical and presently preferred embodiments of the present invention are illustrative as based on the hydraulic experiments and examples. The hydraulic experiments have estimated hydraulic characteristics of the upflow anaerobic reactor in the present invention. Preferred Embodiments relates to a management of waste water by using the apparatus for treating wastewater including the upflow anaerobic reactor 1 in the present invention (See FIG. 8). Hydraulic experiments and examples will explain only the effect of the present invention, and it will be appreciated that those skilled in the art, on consideration of this disclosure, may make modifications and improvements within the scope of the present invention.

Examination of Hydraulic Characteristics in Anaerobic Reactor

In order to elucidate hydraulic characteristics of the upflow anaerobic reactor 1, experiments were performed. The mixing device 40 which had a size of 8 cm in width and 2 cm in length was equipped with 3 layers in the anaerobic reactor 1 which had a size of 9 cm in diameter and 30 cm in height.

In order to measure the degree of dispersion according to the operation of the reactor 1, the water solution with 500 ppm of chloride ion concentration was put into the reactor 1 through 2 thin hoses installed in 5 cm of height from the bottom of the reactor 1 without an injection of returning sludge. Tips of the hoses (corresponding to the nozzle of the reactor 1 practically) were apart from the principal axis by 4 cm and 1.5 cm respectively. Chloride ion solution was injected to make the retentive period of the hoses reach 1 and 3 hours respectively.

The rotations of the mixing device 40 were varied to 0, 3, 5, 10 rpm respectively. The rotational values such as 0, 3, 5, 10 rpm were equal to circumference speeds such as 0.00, 0.75, 1.25, 2.51 m/min respectively.

Figure 9A:
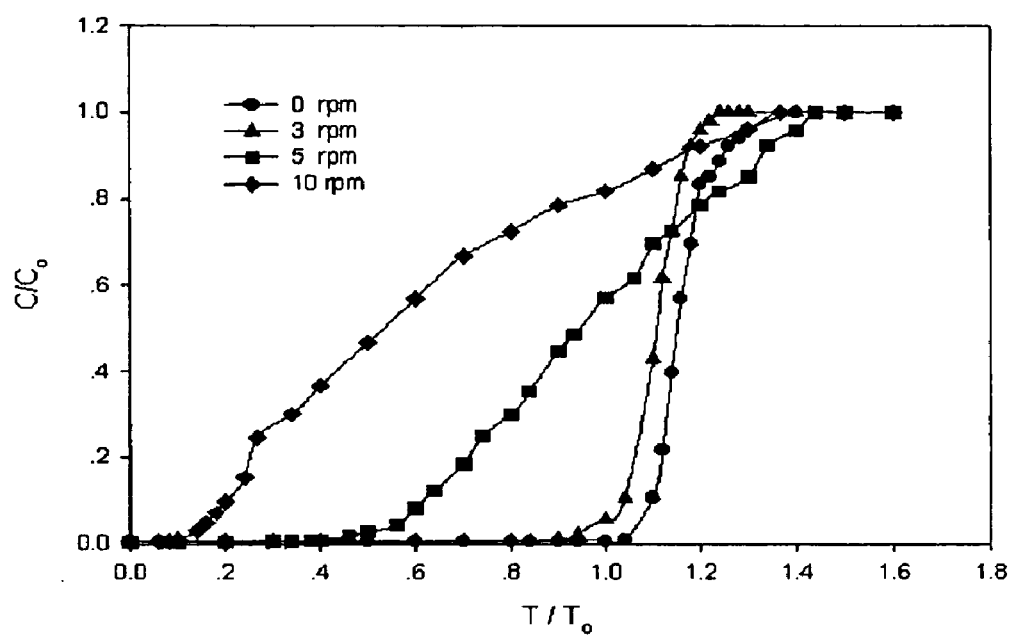
FIG. 9a and FIG. 9b depicts the result of hydraulic experiments in the present invention.
Figure 9B:
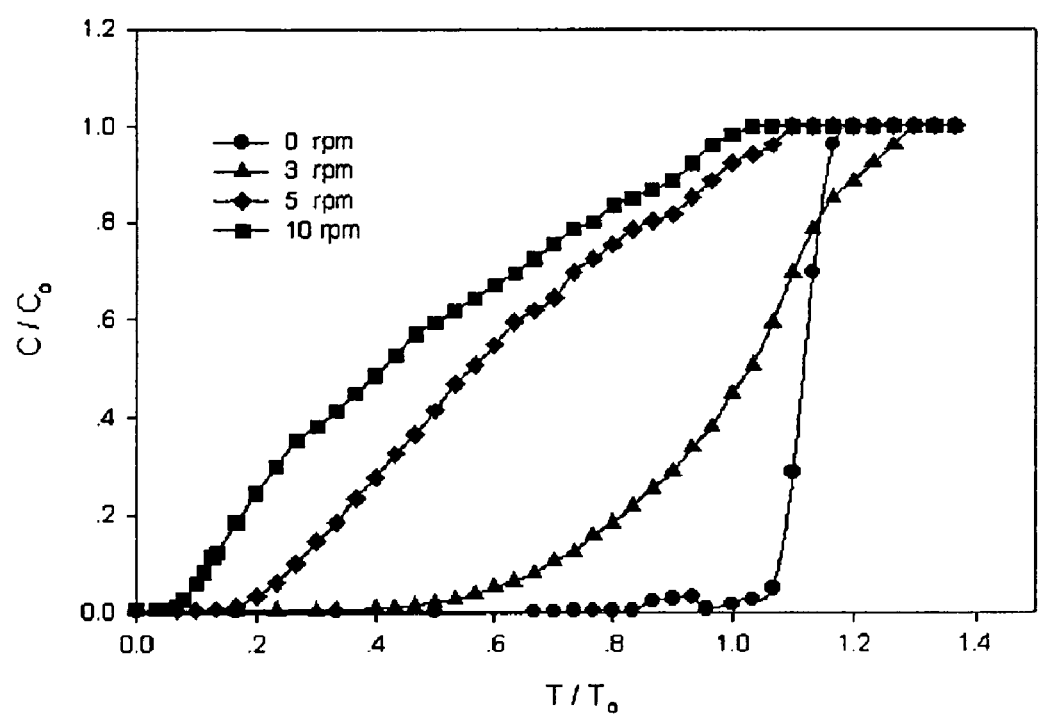

In the graphs, as time passed the changes of concentrations in the outflow water were illustrated based on the retentive time. The chloride ion concentration of the inflow water is regarded as $C0$, the chloride ion concentration of the outflow water is regarded $C$ and the time in which the chloride ion concentrations of the inflow water is identical to that of and of the outflow water is regarded as $T0$. FIG. 9a and FIG. 9b represented the results in 1 and 3 hours of the retentive time respectively.

As illustrated in figures, in case that the retentive time was 1 hour without blending, chlorine ion was started to be detected gradually in the outflow water after 1 hour and the concentration of chloride ion reached $C0$ after 1 hour and 20 minutes. Then, in case that the mixing intensity was 3 rpm, chlorine ion was started to be detected in the outflow water after 55 minutes and the concentration of chlorine ion reached $C0$ after 1 hour and 15 minutes. Meanwhile, in case that the mixing intensity was 5 rpm, chloride ion was started to be detected after 30 minutes and the concentration of chloride ion reached $C0$ after 1 and half hours. In case that the mixing intensity was 10 rpm, chloride ion was started to be detected after 5 minutes from the injection and the concentration of chloride ion reached to C0 after 1 and half hours.

In case that the retentive period was 3 hours and the mixing intensity was 3 rpm, chloride ion was started to be detected after 3 hours and the concentration of C0 was detected in the outflow water within 10 minutes. However, in case that the mixing intensity was 3 rpm, chloride ion was started to be detected after 25 minutes and its concentration became identical to the concentration of the inflow water after 4 hours. Furthermore, in case that the mixing intensity was 5 rpm, chloride ion was started to be detected after 30 minutes and in case that the mixing intensity was 10 rpm after 15 minutes became similar to a perfect mixing form.

As considered the above results, in case that the mixing density was 0 and 3 rpm, the ideal plug flow was approached and in case that the mixing density was 5 and 10 rpm, the perfect mixing form was achieved.

Preferred Embodiments (1) Standard of Pilot Plant System

1) The first type of the present invention, in which wastewater and the returning sludge were introduced to the retentive portion placed on the upper portion of the principal axis and were distributed as a mixed state, was applied as an anaerobic reactor. The concrete structure and standard of the anaerobic reactor were demonstrated in Table 1 as followed.

2) The aerobic reactor: 2.0 m in width, 3.0 m in length, 5.5 m in height, 26 $m^3$ in effective capacity.

3) The precipitate tank: 2.4 m in diameter, 3.0 m in length, 11 $m^3$ in effective capacity.

TABLE 1

| standard | |
|---|---|
| capacity | diameter 2.4 m, height 5.5 m<br>23 $m^3$ |
| 2 outflow tubes | diameter 100 mm, diameter of a circle formed by a rotation, 2.3 m |
| 3 nozzles for each outflow tube | distance from center of each nozzle to the principal axis 64, 90, 110 cm.<br>diameter of a nozzle 80 mm<br>height from bottom to a nozzle 1 m |
| 3 mixing deviceess | width 50 cm, length 2.3 m<br>placed high from the bottom by 2, 3, 4 m respectively |

(2) Operation Condition

1) Flow quantity for treatment: 150 $m^3$/day

2) Rotational speed of principal axis: 0.5 rpm (corresponding to about 3.5 m/min in the circumference speed of the mixing device)

3) Temperature of treatment: treatment in buildings at 20~28° C.

(3) Result

Biological oxygen demand (BOD), chemical oxygen demand (COD), total suspended substance (TSS), total nitrogen concentration (TN) and total phosphorus concentration (TP) of the concentrations of the inflow water and the outflow water were measured total 7 times with a 7 day interval after the apparatus for treating wastewater became stabilized. Concretely, these results of the measurement were illustrated in Table 2 and each treatment efficiency and average efficiency was shown in Table 3.

TABLE 2

| | | BOD | COD | TSS | TN | TP |
|---|---|---|---|---|---|---|
| Test 1 | Inflow Water | 220.7 | 120 | 250 | 33.12 | 5.28 |
| | Outflow Water | 7.95 | 12 | 11 | 10.56 | 0.96 |
| Test 2 | Inflow Water | 219.5 | 121 | 260 | 33.5 | 6.1 |
| | Outflow Water | 7.85 | 11.5 | 10 | 9.8 | 0.75 |
| Test 3 | Inflow Water | 217.8 | 123 | 250 | 32.16 | 6.24 |
| | Outflow Water | 7.83 | 11.7 | 10 | 9.12 | 0.48 |
| Test 4 | Inflow Water | 199.8 | 116 | 220 | 37.9 | 6.72 |
| | Outflow Water | 6.96 | 11 | 6 | 10.1 | 0.5 |
| Test 5 | Inflow Water | 278 | 143 | 350 | 35 | 4.32 |
| | Outflow Water | 7.22 | 11 | 8 | 10.6 | 0.1 |
| Test 6 | Inflow Water | 260 | 105 | 23 | 37 | 4.32 |
| | Outflow Water | 7.52 | 11 | 10 | 7.7 | 0.29 |
| Test 7 | Inflow Water | 157.2 | 109 | 267 | 34.1 | 2.88 |
| | Outflow Water | 6.96 | 10.5 | 7 | 6.24 | 0.06 |

TABLE 3

| | BOD | COD | TSS | TN | TP |
|---|---|---|---|---|---|
| Test 1 | 96.4 | 90.0 | 95.6 | 68.1 | 81.8 |
| Test 2 | 96.4 | 90.5 | 96.2 | 70.7 | 87.7 |
| Test 3 | 96.4 | 90.5 | 96.0 | 71.6 | 92.3 |
| Test 4 | 96.5 | 90.5 | 97.3 | 73.4 | 92.6 |
| Test 5 | 97.4 | 92.3 | 97.8 | 69.7 | 97.7 |
| Test 6 | 97.1 | 89.5 | 56.5 | 79.2 | 93.3 |
| Test 7 | 95.6 | 90.4 | 97.4 | 81.7 | 97.9 |
| Average | 96.5 | 90.5 | 91.0 | 73.5 | 97.9 |

As demonstrated above, while the BOD concentration of the inflow water was changed from 157.2 to 278.0 mg/L, the BOD concentration of the outflow water was treated by more than 96% on the average and varied in the range of 7.0~8.0 mg/L. The nitrogen concentration of the inflow water was changed from the range of 33.1~37.9 mg/L to the range of 6.2~10.6 mg/L in the outflow water and treated by more than 70%. The phosphorus concentration of the outflow water was changed from the range of 2.9~6.7 mg/L to the range of 0.1~0.9 mg/L in the outflow water and stably treated by more than 90%.

After the apparatus for treating wastewater was stabilized, the concentration of sludge within the anaerobic reactor 1 and the aerobic reactor 20 and the concentration of the returning sludge and the discharging sludge were measured and demonstrated in Table 4.

TABLE 4

| | discharging sludge | anaerobic reactor | aerobic reactor | returning sludge |
|---|---|---|---|---|
| concentration (mg/L) | 25800~38000 | 6280~8900 | 4450~6570 | 7490~9830 |

In the apparatus of the present invention for treating wastewater including the anaerobic reactor 1, the highly concentrated sludge was discharged from the anaerobic reactor 1. Especially, it is confirmed that the concentration of sludge is very high when the aerobic reactor 20 and the anaerobic reactor 1 were operated.

INDUSTRIAL APPLICABILITY

As described and confirmed above, the present invention provides the upflow anaerobic reactor 1 which can be applied to a system for treating wastewater. The anaerobic reactor 1 of the present invention can be utilized to treat indecomposable and toxic substances or organic wastewater including nutritive substances such as nitrogen or phosphorus and heavy metals biologically in the industrial facilities for treating wastewater. Furthermore, wastewater can be managed economically since the sludge of the reactor is maintained in the high concentration and the volume can be reduced to less than the volumes of other biological reactors. Especially, since the sludge of the upflow anaerobic reactor 1 is concentrated highly, the concentration tank could be omitted for the sewage treatment plant. The first precipitate tank 30 also can substitute for the reactor and therefore saves the plant space and reduces both the construction cost and the operational cost additionally.

What is claimed is:

1. An upflow anaerobic reactor 1 for applying to an apparatus for treating wastewater which comprises: a principal axis 2 which is formed vertically in the center of the anaerobic reactor 1 and rotates in accordance with a driving force transferred from a driving means; a wastewater inflow tube 3 and a returning sludge inflow tube 4 which are installed in an outer and upper portion of the anaerobic reactor 1 and through which the wastewater and returning sludge are injected respectively; a retentive portion 5 which is installed and fixed on the upper circumference of the principal axis 2 so as to rotate with the principal axis 2 and through which the wastewater and the returning sludge introduced from the ends of the wastewater inflow tube 3 and the returning sludge inflow tube 4 pass; a single or multiple outflow tubes 6 which are installed and fixed on the principal axis 2 so as to rotate with the principal axis 2 and have one end connected with the retentive portion 5 directly and the other end installed in an inner and lower portion of the anaerobic reactor 1 and equipped with a porous tube which discharges a mixture of wastewater and returning sludge; an outflow device 7 which is installed on an upper portion of the anaerobic reactor 1 in order to discharge reaction water including some sludge into the aerobic reactor 20 and has a weir structure; and, a sludge condensing device 8 which is installed on a bottom part of the anaerobic reactor 1 and treats the sludge precipitated in the center of the anaerobic reactor 1 by using a gravitational force.

2. The upflow anaerobic reactor 1 according to claim 1, which comprises additionally a mixing device 40 installed on the principal axis 2 in a uniform interval.

3. An upflow anaerobic reactor 1, for applying to an apparatus for treating wastewater which comprises: a principal axis 2 which is formed vertically in the center of the anaerobic reactor 1 and rotates in accordance with a driving force transferred from a driving means; a wastewater inflow tube 3 and a returning sludge inflow tube 4 which are installed in an outer and upper portion of the anaerobic reactor 1 and through which wastewater and returning sludge are injected respectively; a wastewater retentive portion 5a which is installed and fixed on the upper circumference of the principal axis 2 so as to rotate with the principal axis 2 and through which the wastewater introduced from the end of the wastewater inflow tube 3 passes; a sludge retentive portion 5b which is installed and fixed on the upper circumference of the principal axis 2 so as to rotate with the principal axis 2 and through which the returning sludge introduced from the end of the returning sludge inflow tube 4 passes; a single or multiple outflow tubes 6a, 6 which are installed and fixed on the principal axis 2 so as to rotate with the principal axis 2 and have one end connected to the wastewater retentive portion 5a directly and the other end installed in an inner and lower portion of the anaerobic reactor 1 and equipped with a porous tube discharging wastewater; a single or multiple outflow tubes 6b, 6 which are installed and fixed on the principal axis 2 so as to rotate with the principal axis 2 and have one end connected to the retentive portion 5 directly and the other end installed in an inner and lower portion of the anaerobic reactor 1 and equipped with a porous tube discharging returning sludge; an outflow device 7 which is installed on an upper portion of the anaerobic reactor 1 in order to discharge reaction water including some sludge into the aerobic reactor 20 and has a weir structure; and, a sludge condensing device 8 which is installed on a lower portion of the anaerobic reactor 1 and treats the sludge precipitated in the center of the anaerobic reactor 1 by using a gravitational force.

4. The upflow anaerobic reactor 1 according to claim 3, which comprises additionally a mixing device 40 installed on the principal axis 2 in a uniform interval.

5. An upflow anaerobic reactor 1, for applying to an apparatus for treating wastewater which comprises: a principal axis 2 which is formed vertically in the center of the anaerobic reactor 1 and rotates in accordance with a driving force transferred from a driving means; a wastewater inflow tube 3 and a returning sludge inflow tube 4 which are installed in an outer and lower portion of the anaerobic reactor 1 and through which wastewater and returning sludge are injected respectively; a retentive portion 5 which is installed and fixed on the lower circumference of the principal axis 2 so as to rotate with the principal axis 2 and through which the wastewater and the returning sludge introduced pass since the wastewater inflow tube 3 and the returning sludge inflow tube 4 are connected directly; a single or multiple outflow tubes 6 which are installed and fixed on the principal axis 2 so as to rotate with the principal axis 2 and have one end connected to the retentive portion 5 directly and the other end installed in an inner and lower portion of the anaerobic reactor 1 and equipped with a porous tube which discharges a mixture of wastewater and returning sludge; an outflow device 7 which is installed on an upper portion of the anaerobic reactor 1 in order to discharge reaction water including some sludge into the aerobic reactor 20 and has a weir structure; and, a sludge condensing device 8 which is installed on a lower portion of the anaerobic reactor 1 and treats the sludge precipitated on the central lower portion of the anaerobic reactor 1 by using a gravitational force.

6. The upflow anaerobic reactor 1 according to claim 5, which comprises additionally a mixing device 40 installed on the principal axis 2 in a uniform interval.

7. An upflow anaerobic reactor 1, for applying to an apparatus for treating wastewater which comprises: a principal axis 2 which is formed vertically in the center of the anaerobic reactor 1 and rotates in accordance with a driving force transferred from a driving means; a wastewater inflow tube 3 and a returning sludge inflow tube 4 which are installed in an outer and lower portion of the anaerobic reactor 1 and through which wastewater and returning sludge are injected respectively; a wastewater retentive portion 5a which is installed and fixed on the lower circumference of the principal axis 2 so as to rotate with the principal axis 2 and through which the introduced wastewater and pass since the wastewater inflow tube 3 is connected to wastewater retentive portion directly; a sludge retentive portion 5b which is installed and fixed on the lower circumference of the principal axis 2 so as to rotate with the principal axis 2 and through which the introduced returning sludge pass since the returning sludge inflow tube 4 is connected directly to the sludge retentive portion; a single or multiple wastewater outflow tubes 6a, 6 which are installed and fixed on the principal axis 2 as to rotate with the principal axis 2 and have one end connected to the wastewater retentive portion 5a directly and the other end installed in the inner and lower portion of the anaerobic reactor 1 and equipped with a porous tube discharging wastewater; a single or multiple sludge outflow tubes 6b, 6 which are installed and fixed on the principal axis 2 so as to rotate with the principal axis 2 and have one end connected to the retentive portion 5 directly and the other end installed in the inner and lower portion of the anaerobic reactor 1 and equipped with a porous tube discharging the returning sludge; an outflow device 7 which is installed on an upper portion of the anaerobic reactor 1 in order to discharge reaction water including some sludge into the aerobic reactor 20 and has a weir structure; and, a sludge condensing device 8 which is installed on the lower portion of the anaerobic reactor 1 and treats the sludge precipitated in the central lower portion of the anaerobic reactor 1 by using a gravitational force.

8. The upflow anaerobic reactor 1 according to claim 7, which comprises additionally a mixing device 40 installed on the principal axis 2 in a uniform interval.

* * * * *